Feb. 15, 1927.

T. L. DOWEY 1,617,991

SYNCHRONIZING SYSTEM

Filed Dec. 24, 1923

Inventor:
Thomas L. Dowey
by E.W. Adams Att'y

Patented Feb. 15, 1927.

1,617,991

UNITED STATES PATENT OFFICE.

THOMAS L. DOWEY, OF NEWARK, NEW JERSEY, ASSIGNOR TO WESTERN ELECTRIC COMPANY, INCORPORATED, OF NEW YORK, N. Y., A CORPORATION OF NEW YORK.

SYNCHRONIZING SYSTEM.

Application filed December 24, 1923. Serial No. 682,397.

This invention relates to synchronizing systems and is particularly adapted to be used in connection with talking motion picture systems.

An object of the invention is to maintain a condition of synchronism between the two independently driven devices by regulating the speed of one device with respect to that of the other device.

In accordance with the above object, the present invention contemplates the provision of motion picture apparatus and sound reproducing or recording apparatus which are mechanically interconnected and which derive their power from independent sources of motive power with means controlled by the phase relation of one with respect to the other for producing a condition of synchronism. More specifically, the invention provides a differential gear mechanism which is operated whenever the speed of the motion picture apparatus varies from that of the sound reproducer or recorder for causing the motion picture apparatus to assume a speed corresponding to the speed of the reproducer or recorder.

Referring to the drawing, Fig. 1 illustrates diagrammatically, one embodiment of the invention, Fig. 2 is a sectional view taken along the broken line 2—2 of Fig. 1, and Fig. 3 is a sectional view along line 3—3 of Fig. 1.

A better understanding of the invention may be had from the following description, taken in conjunction with the accompanying drawing wherein the invention is illustrated.

In the drawing there is represented by the rectangle A, a sound reproducer or recorder and by the rectangle B, a motion picture apparatus, which derive their power from independent sources of motive power 5 and 6, respectively. The motor 6 is provided with a shaft 7 to which is secured a gear wheel 8, with its teeth meshed with the teeth of a gear wheel 9 carried by a yoke 10. Extending between the arms of the yoke is a shaft 12 on which there is mounted a worm gear 13. The worm gear 13 is meshed with a gear 14 carried by shaft 15 which extends to the motion picture apparatus B. Also secured to the shaft 12 is a gear 18 having its teeth meshed with those of a corresponding gear 19. The latter gear is carried by a shaft 20 which is also carried by the yoke 10 and which has secured to its other end a bevelled gear 22. The bevelled gear 22 cooperates with a pair of bevelled gears 23 and 24 carried by a shaft 25 and a sleeve 26, respectively. Arranged on the shaft 25 is a ratchet wheel 28. Likewise fastened to the sleeve 26 is a corresponding ratchet wheel 27. Each of these ratchet wheels is arranged to be engaged by pawls under the control of electromagnets 30 and 31.

So long as neither of the ratchet wheels 27 or 28 is engaged by the associated pawl, the worm gear 13 is not rotated, but is, however, revolved with the yoke 10, and in consequence, provides a direct drive connection between the yoke 10 and the gear 14 which as previously described is carried by shaft 15. Likewise gears 18 and 19 are not rotated but do revolve with the yoke 10. However, when either of the ratchet wheels 27 or 28 is engaged by its associated pawl, bevelled gear 22 is caused to rotate thereby providing a fulcrum for gear 19 which rotates gear 18 and in turn worm gear 13. Consequently, the shaft 15 is either retarded or advanced dependent upon which one of the ratchet wheels 27 or 28 is being operated by the associated pawl.

Also secured to the shaft 15 is a bevelled gear 36 having its teeth meshed with those of a similar gear 37 carried by a shaft 38. The shaft 38 is coupled with a shaft 39 by means of a positive clutch 40. The shaft 39 has associated therewith a disc of friction material 41 on one side of which is associated a collar to which there is secured a contact making member 42, which cooperates with a pair of oppositely disposed contacts 44 and 45.

Extending from the sound reproducer or recorder A is a shaft 50 which like the shaft 38 is coupled with a shaft 51 by means of a positive clutch 52. Secured to the shaft 51 and rotated therewith is a rectangular shaped supporting member 53, to which there is secured a plurality of collector rings 55, 56, 57, 58 and 59. Each of the collector rings just enumerated is provided with a brush 60, the contacts 44 and 45 being carried by collector ring 59. The collector rings 55 and 56 are connected to pairs of brushes 62, 63 and 64 mounted on the supporting member 53. Positioned beneath and in cooperative relation with the brushes 62, 63 and 64 are discs 65, 66 and 67, respectively, each of which is provided with an insulated portion 68. The disc 65 is secured to the shaft 39 while the other two discs 66 and 67 are loosely mounted on the shaft but are rotated by power derived from this shaft. The disc 66 as shown in Fig. 2, is provided with an internal gear 69 having its teeth meshed with a pinion 70 which is carried by a bracket 71 and which meshes with a gear 72 secured to the shaft 39. Likewise the disc 67 is driven through a gear 74 carried by the shaft 39, and a pinion 75 which is secured to a bracket 76 and which meshes with the teeth of an internal gear formed in the disc 67 in a manner similar to that shown in Fig. 2. The selection of the gears 72 and 74 is such that they bear a predetermined ratio to the disc 65. For example, the disc 65 is fastened directly to the shaft 39 while the disc 66 may be arranged to have a ratio of 10 to 1, and in turn, the disc 67 may have a ratio with respect to the disc 65 of 100 to 1. By this arrangement, an adjustment for variations in synchronism over a wide range may be obtained, that is, disc 65 functions when there is a difference of one revolution or less, disc 66 from one to 10 revolutions and disc 67 from ten to one hundred revolutions, between the total number of revolutions made by the shaft 15 and the number made by the shaft 50.

In order that the operation of the electromagnets 30 and 31 may be controlled automatically in accordance with changes in the speed of the shaft 15 with respect to the shaft 50, a pair of relays 78 and 79 having their windings connected to the brushes 60 associated with the collector rings 55 to 59 inclusive are provided. Interposed between the relays 78 and 79 is a multiple contact switch 80, the purpose of which will be later explained.

When the shaft 15 is rotated at the same speed as shaft 50, the discs 65, 66 and 67 are in a position such that the insulating portion 68 is engaged by the brushes 62, 63 and 64. Consequently, the relays 78 and 79 are deenergized or are in a position opposite to that shown in Fig. 1. Also the contact making member 42 is in a central position with respect to the cooperating contacts 44 and 45. Assume now for the sake of illustration that the shaft 15 is in advance of the shaft 50. The contact making member 42 will thus be caused to engage contact 44 completing a circuit including the battery 81 with the lower winding of relay 78, the circuit being traceable from the negative pole of battery 81, through the lower winding of relay 78, collector ring 58, contact 44, brush 42, collector ring 59, lower contact of relay 79, upper contact of relay 78 to the positive pole of battery 81. Relay 78 operates and closes a holding circuit extending through the upper winding of the relay, but opens its original operating circuit at its upper contact. The lower armature of the relay 78 is thus attracted, so that a circuit is completed for the upper winding of this relay. The disc 65 in view of the shaft 15 being in advance of the shaft 50 is rotated to a position where the brushes 62 no longer engage the insulated portion 68, a circuit is completed for magnet 30. This circuit may be traced from the negative pole of battery 82, winding of electromagnet 30, contact 83 of switch 80, upper winding and lower alternate contact and armature of relay 78, brush 60 associated with collector ring 55, right-hand brush 62, conducting portion of the disc 65, left-hand brush 62, collector ring 56, brush 60, contact 84, to the positive pole of the battery 82. It is to be noted that the circuit just traced includes the upper winding of relay 78 as previously stated, and that the relay is so adjusted that the current which passes through this circuit is sufficient to keep the lower armature attracted and the lower contact closed, after the lower winding is deenergized. This current is, therefore, maintained from now on and the electromagnet 30 is kept energized as long as any of the pairs of the brushes 62, 63 or 64 is on a conducting portion of one of the collector rings independently of whether the contacts 42 and 44 are closed or not. Furthermore, the relay is so adjusted that this current will attract the upper armature and break the upper contacts thereby opening the circuit which includes the contact 42 so that if this should engage contact 45 associated with the relay 79, no current could pass through the latter. The reason for this will be mentioned later. The magnet 30 is thus energized for causing the engagement of its pawl with the teeth in the ratchet wheel 27 as long as the shaft 15 remains in advance of shaft 50. The engagement of the pawl with the teeth in the ratchet wheel 27 causes bevelled gear 24 to remain stationary thereby providing a fulcrum for gear 19 which starts to rotate and in consequence causes the rotation of worm gear 13. This produces a retardation of shaft 15. This condition will continue until the total number of revolutions of the shaft 15 corresponds to that of shaft 50, that is to say, until the number of revolutions by which the shafts have departed from synchronism with respect to each other is reduced to zero. When such a condition exists, the brushes 62 will again engage the insulating portion 68 of disc 65 thereby opening the energizing circuit of relay 78 for restoring this relay to normal and in consequence causing the retraction of the pawl associated with magnet 30. It is to be noted that as soon as the differential gear 13 begins to act, retarding shaft 15 relatively to shaft 50, the contact 42 will engage contact 45 but as previously pointed out this will have no effect because of the upper contact of relay 78 being kept open as long as any of the pairs of brushes 62, 63 or 64 are connected, that is, as long as the shafts 15 and 50 have an angular displacement relative to each other.

Assume now that the speed of the shaft 15 falls below that of the shaft 50. In this case, the contact making member 42 is caused to engage contact 45 for completing an energizing circuit for the upper winding of relay 79. Relay 79 is energized over a circuit similar to that traced for relay 78. The energization of relay 79 causes the closure of its upper contact. As in the other case, an energizing circuit is established for electromagnet 31 through the collector rings 55 and 56 and the brushes 62 bearing on the conducting portion of the disc 65. The pawl associated with the electromagnet 31 will engage the teeth in the ratchet wheel 28 for holding the bevelled gear 23 against rotation. Likewise a fulcrum is provided for gear 19 which causes the rotation of the worm gear 13 in a direction opposite to that when the ratchet wheel 27 was engaged by the pawl associated with the electromagnet 30. The shaft 15 will now be advanced for bringing it into exact synchronism with the shaft 50.

It is to be noted that the disc 65 takes care of relative angular displacements of one revolution or fraction thereof, the disc 66 displacements of 1 to 10 revolutions, while the disc 67 functions to correct for displacements of 10 to 100 revolutions.

Mechanism is also provided for enabling the shaft 15 to be brought into substantial synchronism with the shaft 50 by the operation of manually controlled means. In addition to the mechanism previously described, there is secured to the gear 9 a pair of collector rings 88 and 89 and a disc 90 which is secured to shaft 15 and which has arranged on a portion of its periphery insulating portions 91. There are as many of these insulating portions 91 as there are pictures projected on the motion picture apparatus in each revolution of the gear 9, that is, the time required to show one picture is equal to the time necessary to rotate one insulating portion and its associated conducting strip past a given point. There is associated with the disc 90 a pair of brushes 92 and 93. Likewise, there is associated with the collector rings 88 and 89, brushes 94 and 95, respectively. In order that the electromagnets 30 and 31 may be made responsive to manual operation, suitable keys 96 and 98 are associated with holding magnets 97 and 99, respectively. However, before either of the keys 96 or 98 can exercise any control over the electromagnets 30 and 31, it is necessary to operate the multiple contact switch 80. This switch 80 in addition to completing the circuits extending between the electromagnets 30 and 31 and the contacts on the keys 96 and 98 also connects the solenoids 86 and 87 in place of the electromagnets 30 and 31 in the circuit which includes the contacts 42, 44 and 45, the brushes 62, 63 and 64 and the relays 78 and 79. As shown in Fig. 1, solenoids 86 and 87 are so connected in this circuit that whenever one of the pairs of brushes 62, 63 or 64 is on a conducting portion of its associated disc as a result of lack of synchronism between shafts 39 and 51, the solenoid which is energized will be the one associated with the shaft which is in advance. The operation of the switch 80 closes, if the shafts 39 and 51 are not in synchronism and the brush pairs 62, 63 and 64 are therefore in contact with the conducting portions of discs 65, 66 and 67, respectively, an operating circuit for either solenoid 86 or 87 depending upon which of the relays 78 and 79 is energized as hereinbefore explained. If relay 78 is operated a circuit is closed to operate solenoid 86 which circuit may be traced from the negative pole of battery 105, through the winding of solenoid 86, contact 106, through the upper winding and lower contact of relay 78, collector ring 55, right hand and left hand brushes of pair 62, 63 or 64, collector ring 56, contact 107, to the positive pole of battery 105. If relay 79 is operated a similar circuit is closed for solenoid 87 except that the circuit extends through the winding of solenoid 87, contact 108, and lower winding and upper contact of relay 79 instead of as described for solenoid 86. The plungers of each of these solenoids are operatively connected to their associated positive clutches and also to breaking discs 101 and 103 so that as soon as one of the solenoids is energized, it will disconnect its associated shaft from the corresponding driving shaft and then hold it at rest by application of the brake until the synchronizing apparatus located within the frame 53 is restored to normal by the rotation of that portion which remains connected to its driving shaft—that is, until none of the pairs of brushes 62, 63 or 64 is on any conducting portion of discs 65, 66 or 67. The circuit for the energizing current of the solenoids is then broken, the brake released, the clutch restored and the synchronizing apparatus carried by both shafts 51 and 39 as long as they remain in synchronism. The purpose of this arrangement is that in case shafts 15 and 51 are purposely shifted in phase by the use of the hand control, the synchronizing apparatus located within the frame 53 may be automatically brought back to normal so as to be ready to be brought into use again. If this were not done and the synchronizing apparatus were brought into use without having been restored to normal, after the relative phase of shafts 50 and 51 had been changed by the use of the hand apparatus, it would cause them to fall out of synchronism by the amount needed to bring it to normal.

Assume now that it is desired to advance the shaft 15. The key 96 would be operated for closing its contacts. Upon the closure of its contacts, a circuit is completed extending from the negative pole of battery 82, winding of electromagnet 31, contact 101, winding of magnet 99, left-hand contact of the key 96, right-hand contact of the key 96, contact and armature of relay 100, contact 102, to the positive pole of battery 82. Key 96 is held in its depressed position due to the energization of magnet 99. The circuit extending from the contacts of the key 96 through the winding of relay 100 is at this moment not completed owing to the engagement of brush 93 with an insulated portion 91 of disc 90. However, when the brush 93 engages a conducting portion of the disc, a circuit is completed for relay 100 which opens its contact so that the magnet 99 is then energized by current which has to pass through relay 100, brushes 92 and 93, and a conducting part of the disc 90. Upon the energization of magnet 31 by the depression of key 96, the associated pawl is caused to engage ratchet wheel 28 thereby causing the rotation of bevelled gear 22 due to the fact that bevelled gear 23 is held against rotation. The rotation of the bevelled gear 22 imparts a rotary movement to gear 19 which in turn causes the rotation of gear 18 and its associated shaft upon which the worm gear 13 is mounted. The worm gear 13 is thus rotated in a direction such that the shaft 15 will be advanced. As just mentioned, when this advance begins the circuit through brushes 92 and 93 is not completed; when it is completed, the energizing current for magnet 31 has to pass through these brushes so that as soon as they reach the next insulating segment, this magnet, electromagnet 99 and the winding of relay 100, are deenergized and the circuit restored to normal, the shaft 15 having been advanced by an amount which advances the phase of the motion picture projector one picture.

Should the key 98 be operated instead of key 96, a circuit is completed for electromagnet 30 and electromagnet 97. Electromagnet 97 maintains the contacts associated with key 98 closed so long as the contact of relay 100 is closed. Electromagnet 30 through the intermediary of the associated pawl, holds the bevelled gear 24 against rotation and causes the rotation of the bevelled gear 22 in a direction opposite to that described for the gear 23. Consequently, the worm gear 13 is rotated in a reverse direction for causing the retardation of the shaft 15. The mechanism for manually bringing the shaft 15 into substantial synchronism with the shaft 50 may be used either alone or as an alternative means of adjustment, particularly for purposely shifting the phase of the shafts 15 and 50, the automatic apparatus being depended on to keep them in synchronism thereafter.

Although the invention has been disclosed and described with reference to a particular type of apparatus, it is, of course, obvious that various modifications may be made without departing from the spirit and scope of the present invention.

What is claimed is:

1. In combination, two independently driven devices, means for interconnecting said devices, said means comprising a rotatable frame and a plurality of rotatable elements within said frame, each arranged to rotate at a different speed and in a definite ratio to its associated elements, means associated with one of said devices for correcting its speed in accordance with the speed of said other device, and means effective when the speed of one device varies from that of the other for employing any of the said rotatable elements to automatically produce a condition of synchronism between said devices, the selection of the particular element depending upon the extent of the differences of the speeds of said devices.

2. In combination, two independently driven devices, means for interconnecting said devices, said means comprising a rotatable frame and a plurality of rotatable elements within said frame, and a rotatable yoke supporting a system of gears associated with said interconnecting means and controlled by any variation in the speed of one of said devices from that of the other to automatically produce a condition of synchronism between said devices by reversing the direction of rotation of said gears.

3. In combination, a reproducer, a motion picture apparatus, independent sources of motive power for said reproducer and said motion picture apparatus, means for interconnecting said motion picture apparatus with said reproducer, automatic means for producing synchronism between said reproducer and picture apparatus, and manually controlled electrical means associated with said interconnecting means and effective at any variation in the speed of said motion picture apparatus from that of said reproducer for producing a condition of synchronism between said reproducer and said motion picture apparatus.

4. In combination, two independently driven devices, means for interconnecting said devices, said means comprising a rotatable frame and a plurality of rotatable elements parallelly arranged within said frame but separately rotatable therefrom, each element arranged to rotate at a speed bearing a fixed but different ratio to its associated elements, means on said elements for detecting a variance in the speeds of said devices, means associated with one of said devices for correcting its speed in accordance with the speed of said other device, and means effective when the speed of one device varies from that of the other for employing any of the said rotatable elements to automatically produce a condition of synchronism between said devices, the selection of the particular element depending upon the extent of the differences of speeds of said devices.

5. In combination, two independently driven devices, means for interconnecting said devices, said means comprising a rotatable frame and a plurality of rotatable elements within said frame, said frame and said elements coaxially arranged to rotate at times at different speeds and said elements also arranged to rotate on a common axis at different speeds, in opposite directions, means associated with one of said devices for correcting its speed in accordance with the speed of said other device, and means effective when the speed of one device varies from that of the other for employing any of the said rotatable elements to automatically produce a condition of synchronism between said devices, the selection of the particular element depending upon the extent of the difference between the speeds of said devices.

6. Apparatus for maintaining two independently driven shafts in synchronism comprising a correcting device, a pair of relays controlling the operation of said correcting device, means for operating said relays when said shafts fail to remain in a condition of synchronism, and other means independent of said first means comprising a plurality of elements rotating at different speeds, each element being operative when the variance of speeds of said shafts is within its own speed and greater than that of its more slowly rotatable associated elements, for maintaining said relays operated until a condition of synchronism is restored.

In witness whereof, I hereunto subscribe my name this 18th day of December A. D., 1923.

THOMAS L. DOWEY.